United States Patent [19]

Yoshioka et al.

[11] Patent Number: 4,471,745
[45] Date of Patent: Sep. 18, 1984

[54] EXHAUST GAS RECIRCULATION SYSTEM FOR INTERNAL COMBUSTION ENGINE

[75] Inventors: Sadashichi Yoshioka; Tatsuro Oda; Yoshitaka Nomoto; Katsuhiko Yokooku, all of Hiroshima, Japan

[73] Assignee: Toyo Kogyo Co., Ltd., Hiroshima, Japan

[21] Appl. No.: 536,984

[22] Filed: Sep. 29, 1983

[30] Foreign Application Priority Data

Oct. 1, 1982 [JP] Japan ............................. 57-172864

[51] Int. Cl.³ ........................................... F02M 25/06
[52] U.S. Cl. ..................................... 123/571; 123/569
[58] Field of Search ........................ 123/571, 569, 568

[56] References Cited

U.S. PATENT DOCUMENTS

| 3,981,283 | 9/1976 | Kaufman | 123/568 |
| 4,163,282 | 7/1979 | Yamada | 123/571 |
| 4,333,440 | 6/1982 | Eheim | 123/569 |
| 4,390,001 | 6/1983 | Fujimoto | 123/571 |
| 4,409,948 | 10/1983 | Hasegawa et al. | 123/571 |

FOREIGN PATENT DOCUMENTS

| 96339 | 7/1980 | Japan | 123/571 |
| 151252 | 11/1981 | Japan | 123/569 |
| 41454 | 3/1982 | Japan | 123/571 |
| 2006988 | 5/1979 | United Kingdom | 123/571 |

*Primary Examiner*—Wendell E. Burns

*Attorney, Agent, or Firm*—Gerald J. Ferguson, Jr.; Joseph J. Baker

[57] ABSTRACT

An internal combustion engine is provided with an exhaust gas recirculating passage for communicating the intake passage and the exhaust passage thereof. The recirculating passage is provided with a valve for controlling the amount of recirculated exhaust gas. A fundamental air-fuel ratio control value for regulating the air-fuel ratio of the intake gas to a predetermined value is corrected by an operating condition correction value according to the operating condition of the engine. The operating condition correction value is successively changed to an optimal value by comparing the actually obtained air-fuel ratio with a predetermined value. The operating condition correction value for correcting the fundamental air-fuel ratio control value when the exhaust gas recirculation is carried out is changed independently from the same for correcting the fundamental air-fuel ratio correction value when the exhaust gas recirculation is not carried out. The initial values of the former correction value and the latter correction value are compared with each other, while the present values of the former correction value and the latter correction value are compared with each other. The comparison value of the initial values and the comparison value of the present values are compared with each other to detect clogging of the recirculating passage. When clogging is detected, the valve is controlled to compensate for the clogging.

5 Claims, 8 Drawing Figures

EXHAUST GAS RECIRCULATION SYSTEM FOR INTERNAL COMBUSTION ENGINE

BACKGROUND OF THE INVENTION

1. Field of the Invention

This invention relates to an exhaust gas recirculation (EGR) system for an internal combustion engine, and more particularly to an improved EGR system in which the amount of the recirculated exhaust gas is kept at an optimal value even when the exhaust gas recirculating passage clogs.

2. Description of the Prior Art

There has been known an EGR system in which a part of the exhaust gas is mixed with the air-fuel mixture by way of an exhaust gas recirculating passage communicating the exhaust passage with the intake passage to reduce the amount of NOx formed in the combustion process of the engine.

When the exhaust gas is mixed with the air-fuel mixture, the amount of the inert component in the air-fuel mixture introduced into the engine is increased and the combustion temperature is lowered, whereby the amount of NOx is reduced. However, if an excessive amount of exhaust gas is mixed with the air-fuel mixture, there arise problems that the engine power is lowered, the amount of unburned gasoline (HC) in the exhaust is increased and the combustion process becomes unstable. Therefore, the amount of the recirculated exhaust gas must be set at an optimal value taking into account these conditions. Thus, the exhaust gas recirculating passage is generally provided with a flow control valve for controlling the amount of the recirculated exhaust gas according to the operating condition of the engine.

However, after long operation of the engine, carbon contained in the recirculated exhaust gas deposits in the exhaust gas recirculating passage to clog it and reduce the effective cross-sectional area of the passage. This reduces the flow rate of the recirculated exhaust gas for a given opening degree of the flow control valve in the exhaust gas recirculating passage so that the desired NOx-reducing effect cannot be obtained In Japanese unexamined patent publication No. 57(1982)-41454 is disclosed an EGR system in which a pressure sensor is provided in the exhaust gas recirculating passage downstream of the flow control valve therein to detect the degree of clogging of the passage by way of the pressure detected by the pressure sensor, and the opening area of the flow control valve for a given operating condition is increased according to the degree of clogging. However this EGR system is disadvantageous in that the structure associated with the exhaust gas recirculating passage is inherently complicated.

SUMMARY OF THE INVENTION

In view of the foregoing observations and description, the primary object of the present invention is to provide an improved exhaust gas recirculating system in which the amount of the recirculated exhaust gas can be kept at an optimal value according to the operating condition of the engine irrespective of clogging of the exhaust gas recirculating passage without complicating the structure associated with the exhaust gas recirculating passage.

There has been proposed an air-fuel ratio control system in which a correction value for correcting, according to the operating condition of the engine, the fundamental air-fuel ratio control value for regulating the air-fuel ratio to a predetermined value is successively changed to an optimal value by comparing the actually obtained air-fuel ratio with said predetermined value. That is, the system has a learning function See Japanese unexamined patent publication No. 55(1980)-96339, for example. The present invention utilizes the learning function of this system. In the system of the present invention, the correction value for correcting the fundamental air-fuel ratio control value when the exhaust gas recirculation is carried out is changed independently from the same for correcting the fundamental air-fuel ratio control value when the exhaust gas recirculation is not carried out. The initial value of the former correction value is compared with the initial value of the latter correction value, and the present value of the former correction value is compared with the present value of the latter correction value. Further the comparison value of the initial values and the comparison value of the present values are compared with each other, and the comparison value of the two comparison values is used to detect clogging of the exhaust gas recirculating passage.

More specifically, the exhaust gas recirculation system of the present invention comprises an exhaust gas recirculating passage which communicates the exhaust passage of the engine with the intake passage of the same and is provided with a flow control means for controlling the amount of recirculated exhaust gas flowing therethrough; an air-fuel ratio detecting means which outputs an air-fuel ratio signal representing the air-fuel ratio of the intake gas introduced into the engine; an operating condition detecting means for detecting the operating condition of the engine; first and second memory means; a control circuit which outputs a first control signal for controlling said flow control means in the exhaust gas recirculating passage to regulate the amount of the recirculated exhaust gas to an optimal value according to the operating condition of the engine, calculates an air-fuel ratio correction value for correcting a fundamental air-fuel ratio control value for controlling the air-fuel ratio of the intake gas, according to the air-fuel ratio signal during closed-loop control of the air-fuel ratio, processes the air-fuel ratio correction value to obtain first and second operating condition correction values respectively for correcting the fundamental air-fuel ratio control values according to the operating condition of the engine when the exhaust gas recirculation is carried out and when the exhaust gas recirculation is not carried out, the first and second operating condition correction values being respectively stored in said first and second memory means at respective predetermined addresses corresponding to different operating conditions, compares a present comparison value obtained by comparing the present first operating condition correction value and the present second operating condition correction value with an initial comparison value obtained by comparing with each other the first and second operating condition correction values when both the first and second operating condition correction values are obtained for the first time, thereby detecting clogging of the exhaust gas recirculating passage and corrects said control signal to obtain a second control signal when clogging of the exhaust gas recirculating passage is detected, the first control signal being fed to the flow control means in the exhaust gas recirculating passage when clogging of the recirculating passage is not detected, and the second control signal being fed to the flow control means when clogging is detected.

Thus, in the system of the present invention, clogging of the exhaust gas recirculating passage can be detected without providing any sensor in the recirculating passage and accordingly without complicating the structure associated therewith.

DESCRIPTION OF THE PREFERRED EMBODIMENTS

Figure 1:
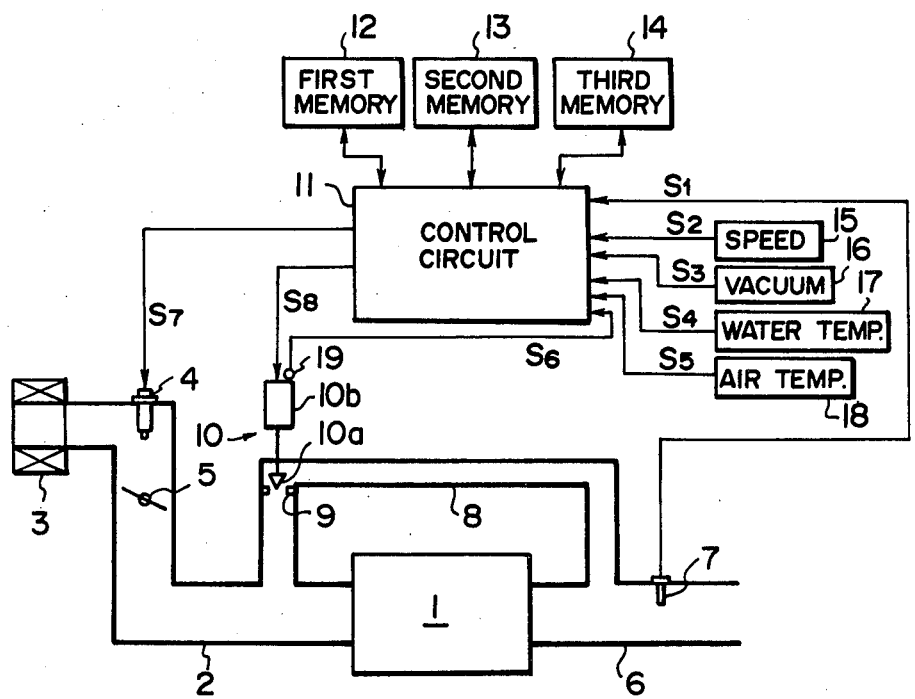
FIG. 1 is a schematic view showing an exhaust gas recirculating system in accordance with an embodiment of the present invention.

In FIG. 1, an engine 1 has an intake passage 2 and an exhaust passage 6 communicated with the combustion chambers (not shown) thereof. An air-cleaner 3 is mounted on the upstream end of the intake passage 2 and a fuel-injection valve 4 is provided in the intake passage 2 downstream of the air-cleaner 3. Further, a throttle valve 5 for controlling the amount of intake air is disposed downstream of the fuel-injection valve 4. The exhaust passage 6 is provided with an oxygen sensor 7 for detecting the residual oxygen concentration in the exhaust. The oxygen sensor 7 is of the type which has been used for detecting an air-fuel ratio, and outputs a high level signal when the air-fuel ratio is less than a theoretical value and the oxygen concentration becomes lower than a predetermined value, and outputs a low level signal when the air-fuel ratio is more than the theoretical value and the oxygen concentration becomes higher than the predetermined value.

The exhaust passage 6 and the intake passage 2 are communicated with each other by way of an exhaust gas recirculating passage 8 which opens in the intake passage 2 downstream of the throttle valve 5. The exhaust gas recirculating passage 8 is provided with a throat portion 9 having a circular orifice. A conical valve body 10a of a recirculation control valve device 10 is inserted into the orifice of the throat portion 9. The recirculation control valve device 10 includes an actuator 10b which controls the insertion depth of the valve body 10a into the orifice to control the effective cross-sectional area of the recirculating passage 8, thereby controlling the amount of recirculated exhaust gas flowing through the passage 8 to the intake passage 2 under the control of a control circuit 11 which will be described in detail hereinbelow.

The control circuit 11 may comprise a microcomputer and is connected with first to third external memories 12 to 14. Into the control circuit 11 are inputted an oxygen concentration signal S1 from the oxygen sensor 7, a rotational speed signal S2 from a rotational speed sensor 15 for detecting the rotational speed of the engine 1, a load signal S3 from a vacuum sensor 16 which detects the engine load by way of the intake-passage vacuum, a water temperature signal S4 from a water temperature sensor 17 which detects the temperature of the coolant of the engine 1, an intake air temperature signal S5 from an intake air temperature sensor 18 which detects the temperature of intake air, and a valve position signal S6 from a valve position sensor 19 which is associated with the actuator 10b of the recirculation control valve device 10 to detect the position of the valve body 10a representing the opening degree of the recirculation control valve device 10. The control circuit 11 processes these signals and outputs a fuel injection signal S7 in the form of a pulse signal for driving the fuel injection valve 4 to obtain a desired air-fuel ratio and a valve driving signal S8 for driving the recirculation control valve device 10 to control the amount of the recirculated exhaust gas to a desired value.

Figure 2:
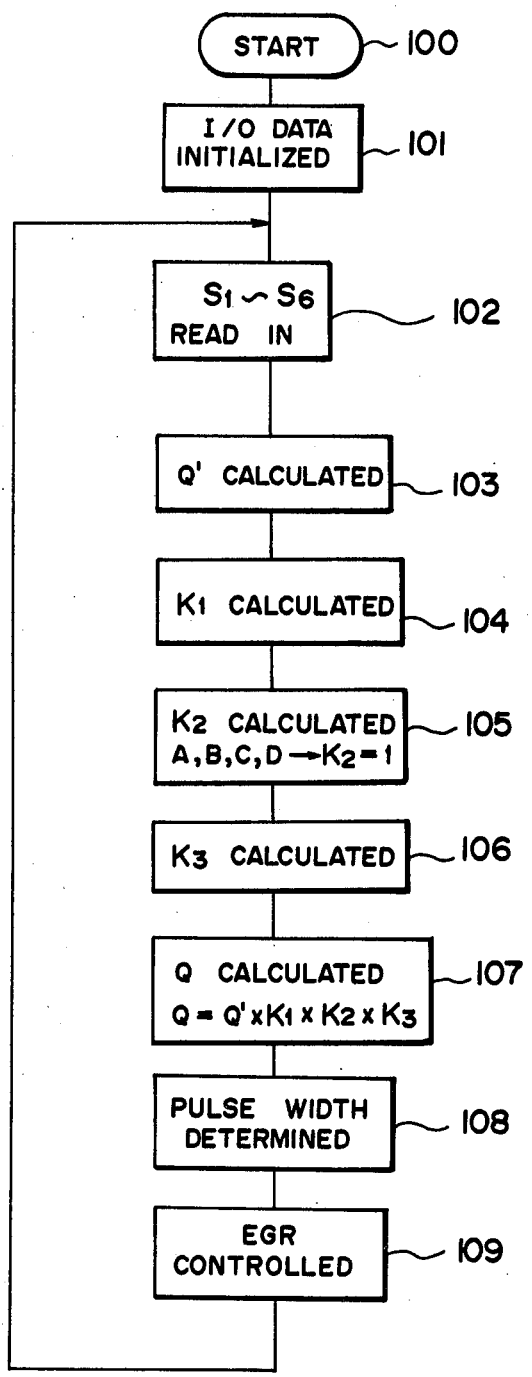
FIGS. 2 to 4 are flow charts illustrating the operation of the control circuit employed in the system of FIG. 1.

FIG. 2 shows a flow chart of the signal processing in the control circuit 11. Control of the fuel injection valve 4 and the recirculation control valve 10 will now be described referring to FIG. 2.

Figure 5:
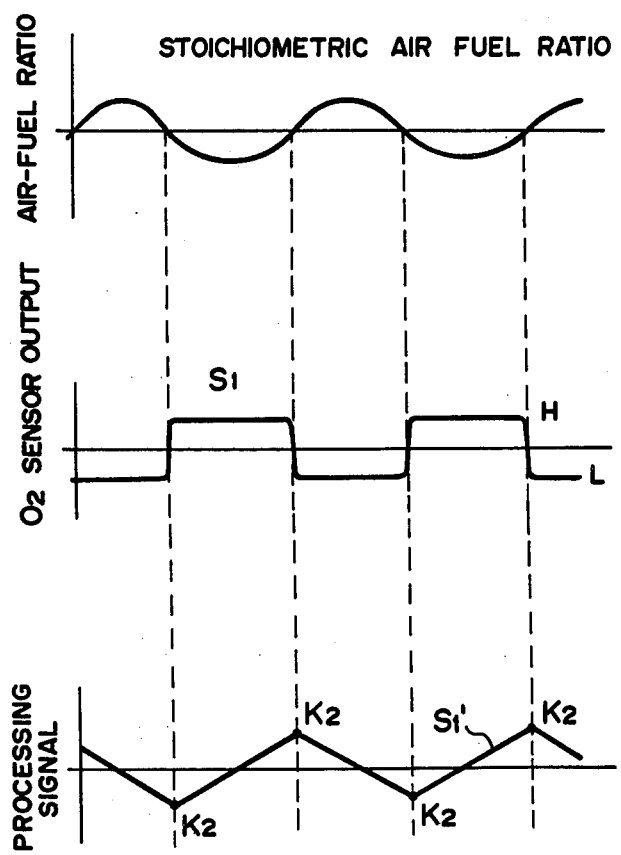
FIG. 5 is a graph illustrating the air-fuel ratio correction value in the system of FIG. 1, FIGS. 6 and 7 show maps of the operating condition correction value in the system of FIG. 1.

In step 100, the microcomputer is started and in step 101 I/O and the data are initialized. Then in step 102 said signals S1 to S6 are read in. In step 103 a fundamental fuel injecting amount Q' is determined according to the engine rotational speed and the engine load respectively represented by the rotational speed signal S2 and the load signal S3. The fundamental fuel injecting amount Q' is determined referring to a map (not shown) which bears the relation of the fundamental fuel injecting amount Q' to the engine rotational speed and the engine load and is stored in a memory such as a ROM. In step 104, a temperature correction value K1 for correcting the fundamental fuel injecting amount Q' according to the coolant temperature and the intake air temperature is determined according to the water temperature signal S4 and the intake air temperature signal S5. Then in step 105, an air-fuel ratio correction value K2 for correcting the fundamental fuel injecting amount Q' according to the actual air-fuel ratio is calculated on the basis of the oxygen concentration signal S1 from the oxygen sensor 7. The air-fuel ratio correction value K2 is an integrated value of the oxygen concentration signal S1 which takes two different values, i.e., the high level or the low level as shown in FIG. 5, and accordingly corresponds to the product of time and the amount of intake air by which the actual amount of intake air is less or more than the amount of intake air required to obtain the stoichiometric air-fuel ratio.

In step 106, an operating condition correction value K3 for correcting the fundamental fuel injecting amount Q' according to the operating condition of the engine 1 is calculated on the basis of the air-fuel ratio correction value K2 as will be described in detail hereinafter.

In step 107, the fundamental fuel injecting amount Q' is multiplied by the correction values K1, K2 and K3 to obtain a fuel injecting amount Q for setting the air-fuel ratio at a stoichiometric air-fuel ratio.

In step 108, the pulse width of the fuel injection signal S7 is determined according to the fuel injecting amount Q. The fuel injection signal S7 controls the opening time of the fuel injection valve 4 to inject fuel by the fuel injecting amount Q. The pulsation of the fuel injection signal S7 is executed in an interrupt processing routine which is started by an interrupt command signal which is generated, for example, when the rotational speed sensor 15 has once completed measurement of the rotational speed of the engine 1 as in the conventional systems of this kind.

In this embodiment, clogging of the exhaust gas recirculating passage 8 is detected utilizing the data used for determining the pulse width of the fuel injection signal S7 and the recirculation control valve device 10 is controlled according to the degree of clogging to regulate the amount of the recirculated exhaust gas to a desired value in step 109. This point will be described in detail hereinbelow.

Figure 3:
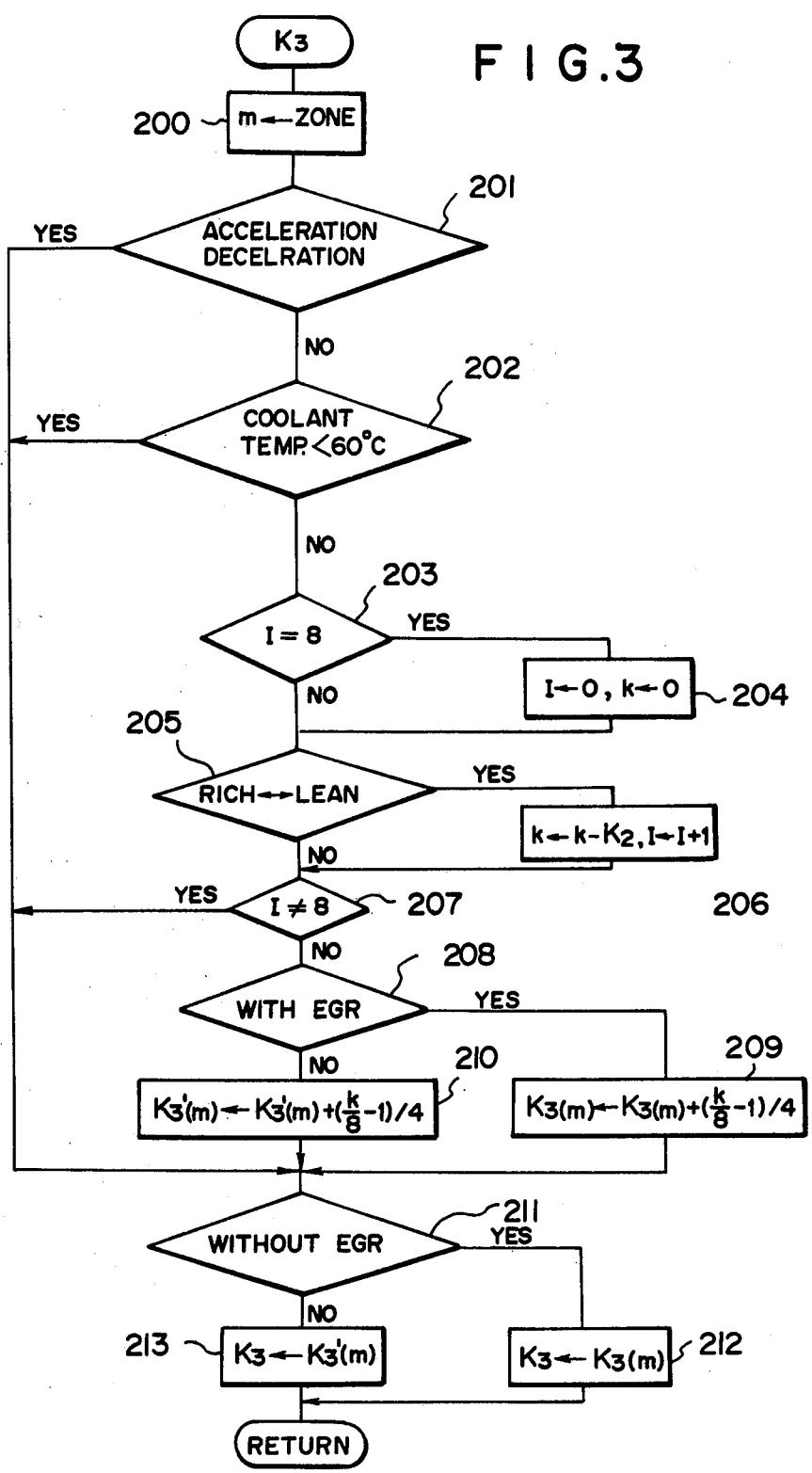
Figure 6:
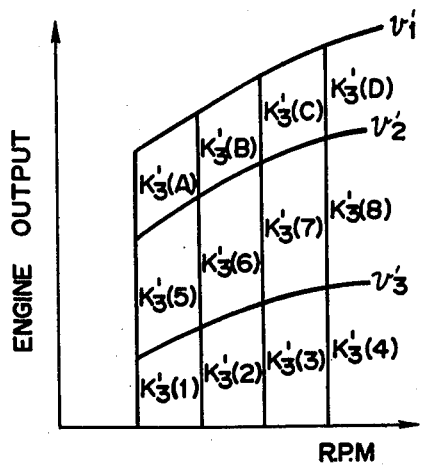
Figure 7:
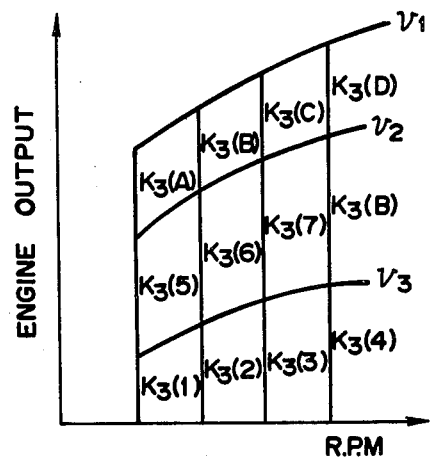

Calculation of the operating condition correction value K3 will be first described referring to FIG. 3. The operating condition is divided into twelve zones, i.e., zones 1 to 8 and zones A to D shown in FIGS. 6 and 7, according to combinations of the engine rotational speed and the engine load (Lines v1' to v3' and lines v1 to v3 in FIGS. 6 and 7 are equi-load curves.), and the operating condition correction value K3 is determined for each operating condition zone. The operating condition correction value K3(m) for zone m (m representing one of the twelve zones) when the exhaust gas recirculation is carried out is stored in the first memory 12 comprising a RAM and the operating condition correction value K3'(m) for zone m when the exhaust gas recirculation is not carried out is stored in the second memory 13 comprising another RAM. The sub-flow shown in FIG. 3 for calculating the operating condition correction value K3 comprises steps 200 to 213. In step 200, the operating condition zone m is first determined from the rotational speed signal S2 and the load signal S3. In step 201, whether the engine speed is changing (whether the engine 1 is either accelerating or decelerating) or not is determined. Further whether or not the coolant temperature is lower than 60° C. is determined in step 202. Only when the engine 1 is neither accelerating nor decelerating and the coolant temperature is not lower than 60° C., i.e., only when the air-fuel ratio correction value K2 is stabilized, the following calculations for obtaining the operating condition correction value K3 are executed. In steps 201 and 202 the coolant temperature is detected from the water temperature signal S4 and whether or not the engine speed is changing is detected from the rotational speed signal S2 and the load signal S3.

Figure 8:
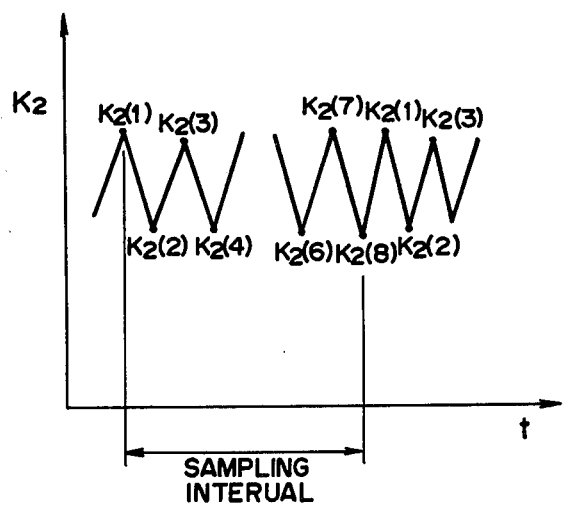
FIG. 8 is a view illustrating processing of the air-fuel ratio correction value in the system of FIG. 1.

In steps 203 to 207, eight successive values of the air-fuel ratio correction value K2 when the air-fuel ratio is moved from the rich side to the lean side or from the lean side to the rich side are sampled (See FIG. 8) and added up together. The sum k of the eight values of the air-fuel ratio correction value K2 obtained when the exhaust gas recirculation is carried out is advanced to step 209 while the same obtained when the exhaust gas recirculation is not carried out is advanced to step 210 in step 208. In step 209, $(k/8-1)/4$ is added to the operating condition correction value K3(m) for the operating zone m which has been stored in the first memory 12 to be used for calculating the fuel injecting amount Q when the exhaust gas recirculation is carried out, to correct the valve K3(m) to a value appropriate to the actual movement of the air-fuel ratio. The corrected value K3(m) is stored in the first memory 12 in place of the previous value. By way of this learning operation, the operating condition correction value K3(m) for the operating zone m is successively replaced by improved values and the air-fuel ratio is controlled more correctly. The feedback control of the air-fuel ratio is not effected for the operating zones A, B, C and D and the air-fuel ratio correction values K2 for these zones are fixed at 1.

Similarly the operating condition correction value K3'(m) which has been stored in the second memory 13 to be used for calculating the fuel injecting amount Q when the exhaust gas recirculation is stopped is successively replaced by improved values.

The operating condition correction values K3(m) and K3'(m) thus respectively stored in the first and second memories 12 and 13 are used for calculating the fuel injecting amount Q in step 107 in the flow chart of FIG. 2. Selection of the memory to be used for calculating the fuel injecting amount Q is made in steps 211 to 213 in FIG. 3 and when the exhaust gas recirculation is carried out, the value K3(m) is used as the operating condition correction value K3, while when the recirculation is stopped, the value K3'(m) is used as the operating condition correction value K3.

Figure 4:
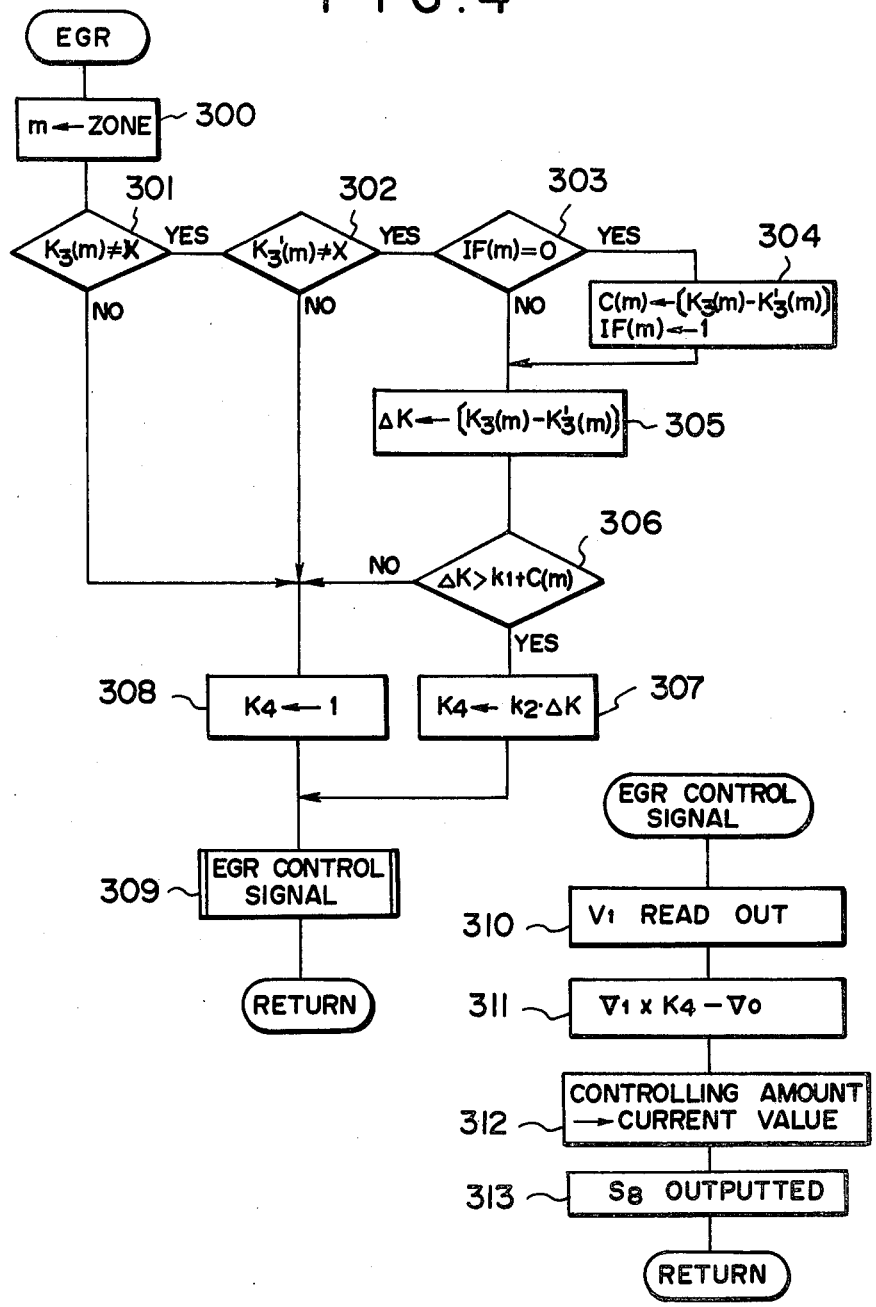

In this embodiment, clogging of the exhaust gas recirculating passage 8 due to carbon deposited therein is detected utilizing the operating condition correction values K3(m) and K3'(m) respectively stored in the first and second memories 12 and 13, and the valve driving signal S8 is corrected according to the degree of clogging to keep the amount of the recirculated exhaust gas at an optimal value. Now description will be made about the correction of the valve driving signal S8 and the detection of clogging referring to FIG. 4. In the sub-flow shown in FIG. 4, the operating condition zone m is first determined in step 300 in a manner similar to that in the sub-flow shown in FIG. 3. The operating condition correction values K3(m) and K3'(m) to be initially stored in the respective first and second memories 12 and 13 may be of an arbitrary value X, and the arbitrary value X is successively refreshed as described above. Whether or not the operating condition correction values K3(m) and K3'(m) are equal to the initial value or the arbitrary value X is determined in steps 301 and 302. The following steps 303 to 305 for determining the degree of clogging are not executed until it is determined that neither of the values K3(m) and K3'(m) is equal to the initial value X in steps 301 and 302. That is, steps 303 to 305 are executed after the values K3(m) and K3'(m) are at least once rewritten during actual air-fuel ratio control. In step 303 is determined the value of a comparison career value IF(m) which represents whether or not the comparison of the values K3(m) and K3'(m) for the zone m with each other has been experienced and is stored in a fixed memory. IF(m)=0 represents that the comparison has not been experienced and IF(m)=1 represents that the comparison has been experienced. When the comparison career value IF(m) is 0 (zero), i.e., when the operating condition correction values K3(m) and K3'(m) for the zone m are compared with each other for the first time, the initial comparison value C(m)=(K3(m)−K3'(m)) is stored in the third memory 14. The third memory 14 comprises a non-volatile memory and the initial comparison value C(m) is held even if the third memory 14 is disconnected from the power source. In this specification, the words "non-volatile memory" should be broadly interpreted to include all memories capable of retaining their contents even when disconnected from the power source. At the same time the comparison career value IF(m) is set at 1 in step 304. After the comparison career value IF(m) for the operating condition zone m is once set at 1 the processing in step 304 is not executed any more and the step 305 is executed immediately after the step 303.

In step 305, the operating condition correction values K3(m) and K3'(m) at present are compared with each other. In the next step 306, the present comparison value $\Delta K = (K3(m) - K3'(m))$ is compared with the sum of the initial comparison value $C(m)$ and a constant $k1$ $(k1 + C(m))$. The value to be compared with the present comparison value $\Delta K$ need not be limited to the sum of the initial comparison value $C(m)$ and the constant $k1$ but may be the product thereof $(k1 \cdot C(m))$. The fact that the present comparison value $\Delta K$ is larger than the value of $k1 + C(m)$ indicates that the exhaust gas recirculating passage 8 is clogged so that the amount of the recirculated exhaust gas is reduced and as a result the proportion of fresh air introduced into the engine 1 is increased. That is, when the proportion of fresh air is increased, the air-fuel ratio correction value K2 is increased in order to control the air-fuel ratio to the stoichiometric air-fuel ratio compensating for the increase in the proportion of fresh air and accordingly the operating condition correction value $K3(m)$ is also increased. Thus it is determined that clogging occurs in the exhaust gas recirculating passage 8 when the $\Delta K$ is larger than $k1 + C(m)$. Of course, $\Delta K$ becomes larger as the degree of clogging increases. Thus in step 307, a clogging correction value K4 (which will be described later) is set as $k2 \cdot \Delta K$, $k2$ being a constant.

The valve driving signal S8 for driving the recirculation control valve device 10 is formed and outputted in a recirculation control step 309. Step 309 comprises the sub-flow shown on the right hand side of FIG. 4. In step 310, a target position V1 of the recirculation control valve device 10 is read out from a target valve position map (not shown) in which the engine rotational speed and the engine load are related to the target position V1 and which is stored in a memory such as a ROM by designating the engine rotational speed and the engine load. In step 311, the actual valve position V0 represented by the valve position signal S6 is subtracted from the product of the target position V1 and the clogging correction value K4 to obtain a valve controlling amount $(V1 \times K4 - V0)$. The valve controlling amount $(V1 \times K4 - V0)$ is converted into the electric current value for the valve driving signal S8 in step 312 and the valve driving signal S8 having the electric current value is outputted in the next step 313 to drive the recirculation control valve device 10 by the valve controlling amount $(V1 \times K4 - V0)$.

When at least one of the operating condition correction values $K3(m)$ and $K3'(m)$ is equal to the initial value X and accordingly said comparison of the two values with each other is not executed, or when it is determined that the exhaust gas recirculating passage 8 is not clogged in the step 306, the clogging correction value K4 is set at 1 in the step 308. Accordingly, in such cases the valve driving signal S8 is outputted as a first control signal corresponding to the difference between the target position V1 and the actual valve position V0. On the other hand, when it is determined that the recirculation passage 8 is clogged, the clogging correction value K4 is set at $k2 \cdot \Delta K$ as described above, and accordingly the valve driving signal S8 is outputted as a second control signal bearing the controlling amount which is obtained by correcting $(V1 - V0)$ by $k2 \cdot \Delta K$, i.e., $(V1 \times k2 \times \Delta K - V0)$.

Since the value of $\Delta K$ corresponds to the degree of clogging as described above, the controlling amount of the recirculation control valve device 10 is corrected according to the degree of clogging and therefore the amount of the recirculated exhaust gas can be kept at an optimal value according to the operating condition of the engine irrespective of the degree of clogging of the exhaust gas recirculating passage 8.

Division of the operating condition zones need not be limited to those shown in FIGS. 6 and 7 but other divisions may be employed taking into account the engine properties and the like. Though in the above embodiment the oxygen sensor 7 is used for detecting the air-fuel ratio, other sensing means such as a CO sensor may be used.

Further, though the control circuit 11 comprises a microcomputer, the control circuit 11 may be formed of a discrete components.

We claim:

1. An exhaust gas recirculation system for an internal combustion engine comprising an exhaust gas recirculating passage which communicates the exhaust passage of the engine with the intake passage of the same and is provided with a flow control means for controlling the amount of recirculated exhaust gas flowing therethrough; an air-fuel ratio detecting means which outputs an air-fuel ratio signal representing the air-fuel ratio of the intake gas introduced into the engine; an operating condition detecting means for detecting the operating condition of the engine; first and second memory means; a control circuit which outputs a first control signal for controlling said flow control means in the exhaust gas recirculating passage to regulate the amount of the recirculated exhaust gas to an optimal value according to the operating condition of the engine, calculates an air-fuel ratio correction value for correcting a fundamental air-fuel ratio control value for controlling the air-fuel ratio of the intake gas, according to the air-fuel ratio signal during closed-loop control of the air-fuel ratio, processes the air-fuel ratio correction value to obtain first and second operating condition correction values respectively for correcting the fundamental air-fuel ratio control values according to the operating condition of the engine when the exhaust gas recirculation is carried out and when the exhaust gas recirculation is not carried out, the first and second operating condition correction values being respectively stored in said first and second memory means at respective predetermined addresses corresponding to different operating conditions, compares a present comparison value obtained by comparing the present first operating condition correction value and the present second operating condition correction value with an initial comparison value obtained by comparing with each other the first and second operating condition correction values when both the first and second operating condition correction values are obtained for the first time, thereby detecting clogging of the exhaust gas recirculating passage and corrects said control signal to obtain a second control signal when clogging of the exhaust gas recirculating passage is detected, the first control signal being fed to the flow control means in the exhaust gas recirculating passage when clogging of the recirculating passage is not detected, and the second control signal being fed to the flow control means when clogging is detected.

2. An exhaust gas recirculation system as defined in claim 1 in which said initial comparison value and the present comparison value are obtained by comparing the first and second operating condition correction values for the same operating condition of the engine.

3. An exhaust gas recirculation system as defined in claim 2 in which the operating conditions of the engine are divided into a plurality of operating condition zones and operating conditions in the same operating condition zone are regarded as the same.

4. An exhaust gas recirculating system as defined in claim 3 in which it is determined that the exhaust gas recirculating passage is clogged when said present comparison value differs from the initial comparison value.

5. An exhaust gas recirculating system as defined in claim 1 in which said flow control means comprises a valve means for changing the effective cross-sectional area of the exhaust gas recirculating passage under the control of the first or second control signal, the effective cross-sectional area of the recirculating passage defined by the second control signal being larger than that defined by the first control signal.

* * * * *

UNITED STATES PATENT AND TRADEMARK OFFICE
CERTIFICATE OF CORRECTION

PATENT NO. : 4,471,745

DATED : September 18, 1984

INVENTOR(S) : Sadashichi YOSHIOKA, Tatsuro ODA,
Yoshitaka NOMOTO, Katsuhiko YOKOOKU It is certified that error appears in the above-identified patent and that said Letters Patent is hereby corrected as shown below:

In the heading of the patent, [73] Assignee:, delete "Toyo Kogyo Co., Ltd." and insert therefor -- Mazda Motor Corporation -- .

Signed and Sealed this

Twenty-third Day of April 1985

[SEAL]

Attest:

DONALD J. QUIGG

Attesting Officer     Acting Commissioner of Patents and Trademarks